Oct. 6, 1959

J. E. JACOBS ET AL

2,907,883

TRANSLATION SYSTEM

Filed April 5, 1955

INVENTORS:-
JOHN E. JACOBS
JOHN F. HOWELL
BY:-
Junius F. Cook, Jr.
ATTORNEY

United States Patent Office 2,907,883
Patented Oct. 6, 1959

2,907,883

TRANSLATION SYSTEM

John E. Jacobs, Hales Corners, and John F. Howell, Cudahy, Wis., assignors to General Electric Company, a corporation of New York Application April 5, 1955, Serial No. 499,304

20 Claims. (Cl. 250—83.3)

The present invention relates in general to apparatus for detecting variations in the density of examination objects in terms of corresponding variations in the electrical impedance characteristics of a detector, comprising a semi-conductor sensitive to penetrating rays, such as X-rays, upon which a beam of such rays is caused to impinge after scanningly traversing an examination object, the invention having more particular reference to an improved translation system adapted, under the control of the ray sensitive detector, to cause the actuation of an operable device in response to the detection of abnormal density conditions in an object under examination.

Apparatus embodying the present invention is particularly well adapted to detect slight density variations such as may be caused by voids within the body of the examined article, or by the presence of objects embedded or enveloped in the body of material under examination, where the constituent material of such embedded objects is of greater or lesser density than that of the body under examination.

An important object of the invention is to provide inspection apparatus particularly well adapted for the detection of cavities or voids, or contaminant bodies, in explosive loads or charges, as in projectiles; another object being to provide improved inspection apparatus wherein an object to be inspected may be scanned by a beam of penetrating rays, such as X-rays, and density variations present in the examination object determined by measuring the change in beam intensity as the same scans said object; a further object being to provide improved electronic circuitry for measuring intensity variations in a scanning beam of penetrating rays.

Another important object of the invention is to provide the combination, with penetrating ray scanning mechanism for detecting density variations in examination objects, of a ray sensitive detector comprising a semiconductor having impedance characteristics which vary with the intensity of incident rays, and a translation system adapted to function under the control of said detector, to cause the actuation of an operable device in response to the detection of abnormal density conditions in an examination object.

Another important object is to provide a translation system of the character mentioned which will be sensitive to voids in an examination object representing very small density variations as compared with the total ray absorption of the examination object; a further object being to provide a system adapted to operate consistently and reliably at high speed for void detection; a further object being to provide a system that will respond freely to slight density variations, such as are caused by voids or occlusions in an examination object, such variations being detected as abrupt, though slight, changes in the impedance of the scanning beam detector, the system being substantially inert to density variations, such as may be caused by gradual changes in the sectional shape of the examination object, which variations, as measured by scanning the examination object, occur at relatively uniform or slow rates of speed.

Briefly stated, in accordance with one aspect of the invention, mechanism may be provided for turningly spinning an examination object in the path of a scanning beam of penetrating rays directed upon a ray sensitive detector at a scanning station, while shifting the object in the direction of the axis of spinning movement, whereby the ray beam may scan the inspection object along a helical path throughout a zone or portion of the object. The mechanism may also include means for shifting the object to another scanning station in which the object may be twirled and axially shifted in the path of another ray beam directed upon a corresponding ray sensitive detector at said other scanning station. An adjacent zone or portion of the examination object may thus also be scanned along a helical scanning path. Each of the detectors may be controllingly associated with a corresponding translation system for driving or otherwise controlling the operation of mechanism, such as indicating, recording, marking, or reject apparatus, in response to density variations, such as voids or occlusions, detected in the examination object in terms of the response of the ray sensitive detectors to intensity variations in the penetrating ray beams incident thereon after traversing the examination object. The apparatus may include disabling means, such as switches interconnected with the translation systems or in the operating or control circuits of mechanism actuated by or under the control of said translation systems, in order to prevent spurious operation of such mechanisms during the indexing of the examination object between scanning stations. The translation systems may be associated each with regulator circuit means for rendering the same relatively insensitive to density changes which vary at uniform or slow rates of speed in the examination object as scanned by the detectors, while maintaining high sensitivity in response to abrupt density changes such as are produced by voids or occlusions in the body of the examination object.

The foregoing and numerous other important objects, advantages, and inherent functions of the invention will become apparent as the same is more fully understood from the following description, which, taken in connection with the accompanying drawings, discloses a preferred embodiment of the invention.

Referring to the drawings.

To illustrate the invention the drawings show an article or object 11 to be inspected for density variations. While the invention is not necessarily restricted to any particular kind of inspection object, the article 11, as shown, may comprise a container and its contents. Specifically, the drawings show a projectile, such as the explosive head of a rocket, comprising a case adapted to contain an explosive charge. In the manufacture of projectiles embodying explosive charges, it is desirable to be able to detect imperfections not only in the shell or container, but also in the explosive material with which the shell is loaded; and the present invention provides exceedingly efficient means for examining projectiles of the character mentioned for the purpose of detecting defects at the factory.

The invention, of course, is not necessarily limited to the examination of explosive projectiles. Indeed, its principles may be equally well applied to the detection of density variations in any X-ray translucent material, including metal articles, packaged food products, and numerous other manufactured items. In this connection, examined material, including the material of which the container is made, may be opaque, translucent, or transparent to visible light rays, the same, in the illustrated embodiment, comprising an outer container or shell S of metal, such as steel, having thickness of the order of ⅛ inch, a filling F of explosive, comprising in the illustrated embodiment a so-called "shaped" charge, and a metal charge shaping cone M, as of copper, having thickness of the order of ⅛ inch to define an inner conical configuration within the body of the explosive charge, as shown more particularly in Fig. 3 of the drawings. The outer shell or casing of the projectile shown in Fig. 3 may be formed with a conical nose portion N, a cylindrical side wall portion W, and an inwardly tapered trailing portion T terminating in a threaded collar C, by means of which the charged shell 11 may be secured upon a suitable tail structure to constitute the assembly as a rocket, the tail structure serving to guide and propel the rocket.

Figures 1, 3:
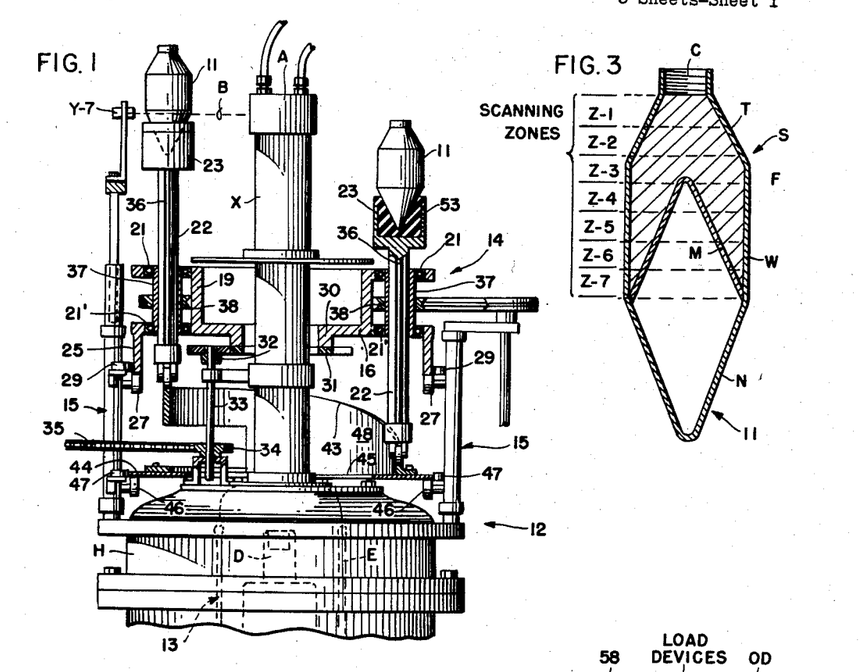
Fig. 1 is a sectional view taken through inspection apparatus for the detection of density variations in examination objects, the view being taken substantially along the line 1—1 in Fig. 2.
Fig. 3 is an enlarged sectional view taken through an examination object of the sort adapted to be inspected by operation of the apparatus shown in Figs. 1 and 2.
Figure 2:
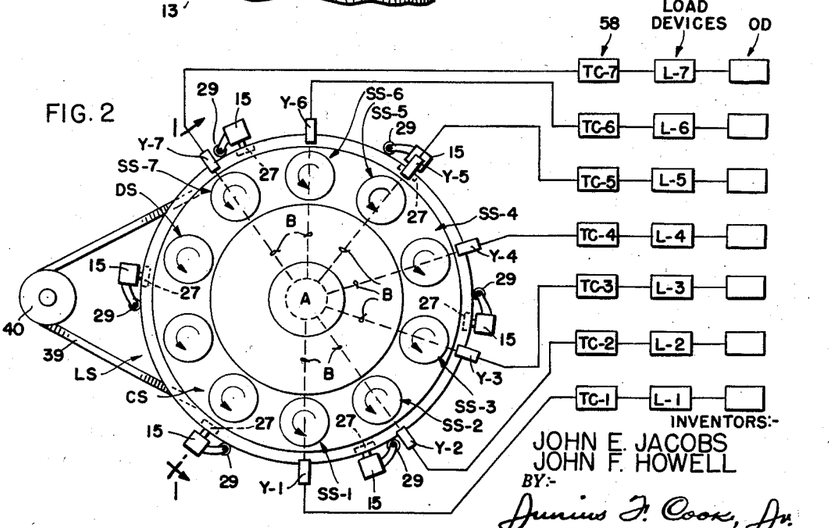
Fig. 2 is a top plan view of the apparatus shown in Fig. 1.

The present invention provides apparatus 12 operable to support articles of the type illustrated in Fig. 3 in position to be inspected by scanning the same in X-ray beams B emitted from a suitable source of X-rays and directed through examination objects upon ray sensitive detectors each disposed in the path of a corresponding scanning beam at a scanning station. The X-ray source may comprise a conventional X-ray generating tube 13 having a cathode D and a cooperating anode A enclosed within a sealed and evacuated envelope E. As shown, the ray generating tube 13 may be of the type wherein the anode is disposed at and within the end of a tubular envelope extension X, as of metal, in position to emit a plurality of X-ray scanning beams B of pencil-like character radially of said envelope extension, through suitable collimating means associated with the extension X, there being seven of such scanning beams and associated detectors Y–1, Y–2, Y–3, Y–4, Y–5, Y–6 and Y–7, forming circumferentially spaced scanning stations.

Since the envelope E of the X-ray tube commonly comprises fragile material, such as glass, it may be and preferably is enclosed in a suitable housing or tank H, as of heavy gauge sheet metal, to protect the fragile portions of the envelope E, said housing being rigidly connected with the envelope extension X as at the junction thereof with the tube envelope E. Any suitable or preferred means may be provided for supporting the X-ray generating tube and its housing in operative position, preferably with the envelope extension X projecting vertically upwardly of the remaining portions of the envelope E.

The apparatus 12 embodies means for supporting examination objects 11 in the path of the scanning beams B, for twirling and axially shifting the examination objects in the beams, and for moving each examination object successively into scanning position with respect to the several beams, and to support each examination object so that each beam will scan a different zone of the object. To these ends, the apparatus 12 comprises carriage means 14 supported on a framework 15, which may be conveniently erected upon the housing or casing H which encloses the envelope of the ray generating tube. The carriage means 14, as shown, may comprise a turnable carriage frame 16 of circular configuration, said carriage frame being supported upon the framework 15 for turning movement around the anode carrying envelope extension X. The carriage frame may comprise a pair of spaced apart upper and lower plate portions 17 and 18 secured in spaced relationship, as by means of an integral sleeve-like spacing portion 19.

Outwardly of the spacing portion 19 the plate portion 17 may be provided with circularly spaced apart shaft bearings 21; and the plate portion 18 likewise may be provided with circularly spaced shaft bearings 21' in alinement with the corresponding bearings 21, there being ten pairs of alined bearings 21 and 21' circularly spaced apart in the carriage frame 16 of the illustrated embodiment. Each pair of alined bearings 21 and 21' turnably supports a corresponding shaft 22. The several shafts 22 thus supported in the alined bearing pairs have ends extending upwardly of the plate portion 17, said upwardly extending shaft ends carrying upwardly opening cups 23 secured on and in axial alinement with the cup carrying shafts 22. The cups 23 are adapted to support examination objects in position to be scanned by the beams B. The shafts 22 also have lower ends extending beneath the plate portion 18, said lower ends being turnably journaled in roller step bearings contained in wheel carrying ferrules 24.

Means is provided for turnably supporting the carriage frame 16 in the framework 15, the carriage frame, to this end, being preferably provided with a dependent skirt portion 25 formed integrally on and at the peripheral edge of the plate portion 18 outwardly of the shaft bearings 21', said skirt portion providing a lower finished edge 26 adapted to engage and ride upon rollers 27 turnably supported upon the framework 15, in order to support the carriage frame 16 at a desired elevation in the structure, in position encircling the envelope extension X of the ray generating tube. The skirt portion 25 may also be formed circumferentially thereof with a cylindrical centering track 28 adapted to rollingly engage a plurality of circularly spaced guide rollers 29 mounted in the framework 15, to maintain the carriage frame in concentric alinement with respect to the axis of the anode carrying envelope extension X.

Means is provided for progressively turning the carriage frame 16 about the envelope extension X in order to position the shafts 22 and the carrying cups 23 successively at circularly spaced apart stations, including a loading station LS, a conditioning station CS, scanning stations SS–1, SS–2, SS–3, SS–4, SS–5, SS–6 and SS–7, each in alinement with a corresponding ray beam B, and a discharge station DS, there being in the illustrated embodiment a total of ten equally spaced apart stations to which the carriage frame may be turned. In order to thus progressively turn the carriage frame 16, the lower plate portion 18 may be formed centrally with a dependent collar portion 30, upon which may be secured the driven element 31 of a Geneva wheel driving mechanism, the driving element 32 of which is secured on a shaft 33 which is turnably journaled in the framework 15. Any suitable means, such as a driving sprocket 34 on the shaft 33 and a sprocket driving chain 35 drivingly associated with the sprocket 34, may be employed for actuating the Geneva wheel mechanism. The carriage frame 16 together with the shafts 22 and carrying cups 23, accordingly, may be progressively turned about the anode carrying envelope extension X of the ray generating tube in order to successively position examination objects 11 supported in the cups 23 in the scanning beams B.

In order to twirl examination objects in the path of the beams B, means is provided for rotating the shafts 22 in the bearings 21 and 21', means being also provided for axially shifting the shafts 22 in order to shift the examination objects axially as the same are twirled in the path of the scanning beams. To these ends, the shafts 22 may be provided with spline grooves 36 and may be mounted for axial sliding movement in sleeves 37 journaled in the bearings 21 and 21' and fitted with driving pulleys 38, an endless driving belt 39 being drivingly engaged with the pulleys 38, except when the associated cup carrying shafts are disposed at the loading and unloading stations. The belt 39 may be driven by a pulley 40 drivingly connected with a suitable motor 41, as through any suitable or preferred transmission means 42.

The motor 41 may serve as a source of driving power for the Geneva wheel mechanism, as by connecting the same with a sprocket 34' drivingly associated with the chain 35. Alternately, the Geneva wheel mechanism may be driven from a source of driving power other than the motor 41; in fact, any suitable or preferred means may be employed for progressively turning the carriage frame 16 through the Geneva wheel mechanism 31, 32.

As shown more particularly in Fig. 3 of the drawings, the present invention contemplates inspection of each examination object 11 by scanning successive zones of the object, such as the axially extending zones Z-1, Z-2, Z-3, Z-4, Z-5, Z-6 and Z-7, each zone being scanned at a corresponding one of the scanning stations SS-1, SS-2, SS-3, SS-4, SS-5, SS-6 and SS-7 of the inspection apparatus. Means is provided for shifting the examination object axially as the same is being scanned at each of the scanning stations in order to scan each zone along a helical scanning path, so that all portions of each zone may be closely scrutinized by a scanning beam. The present invention also provides means to present the examination object in such axially shifted position initially in each station so that the scanning of each zone may commence substantially in alinement with the terminal portions of an adjacent zone in registration with the portions of the examination object where the scanning of such adjacent portion terminates. Such arrangement assures that the examination object may be completely scanned in all portions of each of its several scanning zones.

The Geneva wheel mechanism, of course, determines the indexing movement of the carriage frame 16, each lobe of the wheel 31 defining a corresponding indexed position of the carriage frame. In order to axially shift examination objects at the several scanning stations, a circular cam 43 may be provided to axially shift the shafts 22 on which the examination objects are supported at the scanning stations, said cam comprising a support plate 44 of circular peripheral configuration and having a central opening 45 whereby the same may be turnably supported in the framework 15 in position encircling the envelope extension X of the X-ray tube, said plate being so turnably supported in any suitable or preferred fashion, as by means of circumferentially spaced rollers 46 carried on the framework 15 in position underlying the peripheral edge of the plate. The plate may be held in axial alinement with respect to the other structural components of the inspection apparatus, as by means of circumferentially spaced rollers 47 mounted on the framework 15 in position to rollingly engage the peripheral edge of the plate 44. The plate 44 carries a cylindrical cam forming member 48 secured thereto in coaxial alinement with the carriage frame 16, said cam forming member 48 having an upwardly facing edge disposed in position lying beneath and in alinement with the shafts 22, said edge being curved to form the shaft shifting cam 43.

Each of the ferrules 24, in which the shafts 22 are turnably journaled in step bearings, may be provided with grooved rollers 49 adapted to straddle and thus ridingly engage the cam forming edge of the cylindrical member 48; and means is provided for turning the shaft shifting cam structure from a retracted or starting position to a projected position during the interval while the carriage frame 16 remains stationary in each of its indexed positions, the shaft shifting cam structure being returned to its retracted position during the period when the carriage frame 16 is advanced from one indexed position to its next adjacent indexed position. The cam 43 is configurated so that, in turning from retracted to projected position, each of the shafts 22 will be axially shifted through a displacement corresponding with the width of the examination zones. Accordingly, each of the several examination objects disposed in the several examination zones will be moved in desired fashion in the path of a scanning beam B as the object is twirled in place in the examination zone. By returning the cam structure to retracted or starting position as the carriage frame 16 is advanced from one indexed position to another, it will be seen that each object supporting shaft 22 will occupy the same axially shifted position with respect to the carriage frame during indexing movement of the frame, whereby the initial scanning position of each shaft 22 and the examination object carried thereby at each successive scanning station will be the same as the final scanning position occupied thereby at a preceding scanning station.

Intermittent cam driving means 50 may be provided for projecting and retracting the shaft shifting cam structure in desired fashion, such driving means 50 being preferably actuated in timed relation with the operation of the carriage frame driving mechanism. As shown, the driving means 50 comprises an actuating arm 51 connected with the shaft shifting cam structure and an arm driving cam 52 driven in common with the chain driving sprocket 34'.

It will be seen that the examination object support shafts 22 will be drivingly disconnected from the belt 39 when in the discharge and loading stations DS and LS. Any suitable handling mechanism may be provided for applying examination objects in the supporting cups 23 as the same successively occupy the loading station LS. As shown more particularly in Fig. 1 of the drawings, each cup 23 may be fitted with an insert 53 shaped to receive and firmly support an examination object, the insert 53 preferably comprising a body of rubber-like material shaped to snugly fit the cups 23 and formed, in the illustrated embodiment, with an upwardly opening, conical cavity adapted to snugly and frictionally receive the nose portion N of the examination object comprising an explosive rocket head.

It will also be apparent that the sensitive detectors Y-1, Y-2, Y-3, Y-4, Y-5, Y-6 and Y-7 will each be irradiated by the corresponding pencil-like X-ray beams only after the same have passed through the articles being inspected. The intensity of X-rays thus applied upon the inspection objects will depend upon the X-ray absorptive character of the material through which the ray beam shall have passed in reaching a detector. If a beam be transmitted through a portion of the examination object containing a void or cavity, the intensity of rays impinging upon the detector will be relatively higher than where the beam traverses voidless portions of the examination object. Conversely, the intensity of rays impinging on a detector after passing through portions of the examination object containing impurities or embedded foreign objects will be relatively lower than where the beam traverses uncontaminated portions of the examination object, provided, of course, that such impurities or embedded objects be of greater X-ray opacity than the material of the examination object. Where impurities are of lesser X-ray opacity than the material of the examination object, the X-ray beam impinging on the detector will, of course, be of relatively greater intensity than where it traverses portions of the article that are free of relatively transparent impurities or voids.

The X-ray sensitive detector elements Y-1, Y-2, Y-3, Y-4, Y-5, Y-6 and Y-7 preferably each comprise crystalline, ray sensitive semi-conductor material, such as the sulphides or selenides of cadmium and mercury. The electrical characteristics of the named materials are such that the impedance thereof progressively declines or becomes reduced in proportion to the intensity of X-rays impinging thereon and, as more fully explained in co-pending applications for U.S. Letters Patent, Serial No. 190,801, filed October 18, 1950, Serial No. 232,073, filed June 18, 1951, and Serial No. 441,873, filed July 7, 1954, the intensity of impinging X-rays may be accurately measured in terms of the apparent impedance of the sensitive semi-conductor material forming the detectors Y-1, Y-2, Y-3, Y-4, Y-5, Y-6 and Y-7.

Each of the detectors Y-1, Y-2, Y-3, Y-4, Y-5, Y-6 and Y-7 may be controllingly associated with corresponding translation circuit means TC-1, TC-2, TC-3, TC-4, TC-5, TC-6 and TC-7 adapted to actuate load devices L-1, L-2, L-3, L-4, L-5, L-6 and L-7 in accordance with abnormal density variations in examination objects as measured by the ray sensitive detectors. These load devices may conveniently comprise relays for controlling the operation of corresponding devices OD, the operation of which is desired in response to detected abnormal density variations in the examination object. The operable devices OD may comprise any suitable or preferred indicating, recording, marking, or rejecting apparatus.

Figure 7:
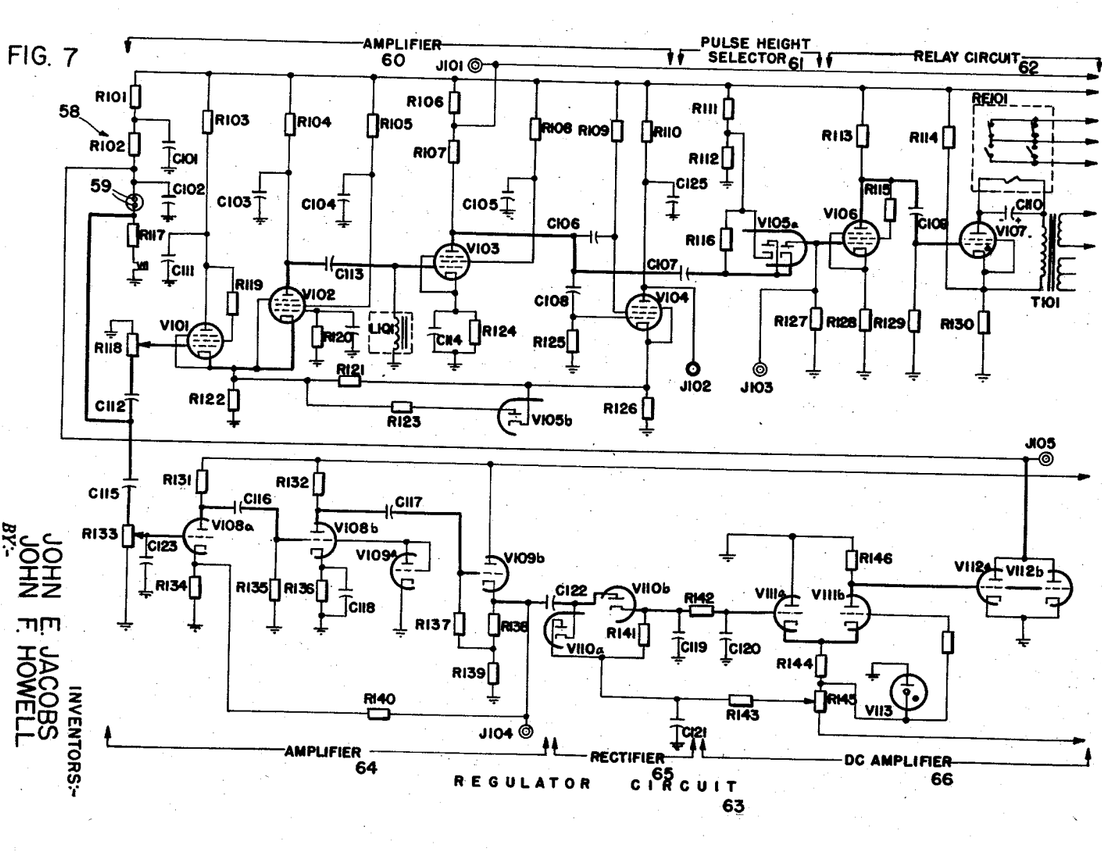
Fig. 7 is a circuit diagram illustrating a translation system embodying the present invention and particularly adapted for use in conjunction with the apparatus shown in Figs. 1 and 2.

As shown more particularly in Fig. 7 of the drawings, the translation circuit means TC-1, TC-2, TC-3, TC-4, TC-5, TC-6 and TC-7 may each comprise an electronic translation system 58 adapted for connection with its associated ray sensitive detector through input terminals 59, said system comprising an amplifier section 60 controlled by the connected detector, a pulse height selector section 61 coupling the output of the amplifier section with the input side of a relay circuit section 62, connected as through a thyratron valve V107 to drive relay means RE101 comprising the controlled load device to be actuated in accordance with the response of the detector means to abnormal density conditions in an object 11 being examined.

The X-ray absorbing background of examination objects being inspected should be of a relatively uniform nature, that is to say, all variations in the density of the examination objects, other than abnormalities such as voids, should be of a relatively gradual nature to prevent such variations from being falsely indicated as voids. In that connection, it will be noted that examination objects of the sort shown in Fig. 3, as scanned from one end thereof toward the other, will show fairly gradual density change varying at a substantially uniform rate; and the translation system 58 includes a regulator circuit 63, comprising an amplifier section 64, a rectifier section 65, and a D.C. amplifier section 66, to compensate for variations of a gradual or uniform character in the output of the X-ray generator and in the background ray absorption of the examination objects.

The sensitivity of the translation system is thus maintained substantially constant for an extremely large density variation in the examination objects or in the output intensity of the ray generator, where such variation occurs gradually or at a uniform or slow rate of speed. The translation system 58, however, is extremely sensitive in response to abnormalities such as voids or occlusions of foreign matter which represent abrupt density changes as observed at the detector by action of the scanning beam, even though such abrupt changes may represent but a relatively small proportion of the total X-ray absorption of the examination object. Where a semi-conductor, such as a cadmium or mercury sulphide or selenide crystal is employed as the detector element and is irradiated by a scanning beam of X-rays of pulsating character, such as are emitted by conventional X-ray generating tubes energized for operation by alternating current power, a fluctuating component is present in the output current of the detector. Such component may be amplified and detected in the amplifier section 60 of the translation system 58, the regulator circuit 63 controlling the voltage or field applied to the detector in order to compensate for variations in the output of the X-ray generator, and in the background density variations of the examination sample.

The output component of the detector may be applied to the grid of an electron flow valve V101, as through the resistance-capacitance network comprising the condenser C112 and the adjustable rheostat R118. The valve V101, in conjunction with an electron flow valve V102, may serve as a non-inverting amplifier having the advantages of a cathode following input circuit. An inductance L101 may be used in the coupling network between the valve V102 and an electron flow valve V103 to exclude the low frequency response of the amplifier, and thus prevent motorboating oscillation at the instant when the phase shift reaches a critical value at low frequency. The output circuit of the flow valve V103 serves as the actual void detecting output of the amplifier and is connected to drive both the control and screen grids of an electron flow valve V104.

The valve V103 constitutes the medial stage of a negative feedback loop which includes the flow valves V102, V103 and V104. The effect of negative feedback in the amplifier serves to maintain relatively constant amplification, independent of all internal parameter changes, by controlling the amount of output voltage that is fed back to the input and thus subtracted from the input signal. The amount of input signal which the amplifier can accommodate without saturation is determined, for the most part, by the amount of energy fed back to the input circuit. In the amplifier shown, the feedback ratio for positive going input signals may be of the order of $\frac{1}{10}$ that for negative going signals. This is accomplished by the uni-lateral network consisting of resistors R121 and R123 and a rectifier V105b, said network functioning to cause saturation of the amplifier in response to a positive going input signal of predetermined value, while requiring a negative going input signal having amplitude of the order of ten times that of the positive going signal in order to saturate the amplifier.

In the illustrated amplifier section 60, a positive going input signal is inverted and hence appears as a negative going signal. This is applied to the grid of the output stage of the feedback loop. To assure early or rapid saturation of the output stage, the signal is also applied upon the screen grid of the valve V104, thereby reducing the gain of said valve and limiting the magnitude of feedback energy. As a consequence, energy delivered in the output circuit of the flow valve V103 continues to increase even though the output stage has become saturated. Where a negative going input signal is applied, the foregoing conditions are reversed as the screen grid of the valve V104 is driven positive. Accordingly, the output stage does not become saturated. For proper operation of the amplifier, the level of input energy to the valve V101 should be held at a value just below that which causes the valve V104 to become saturated. To this end, the regulator circuit 63 is provided.

The regulator circuit is coupled with the detector in parallel with the amplifying section of the void detecting translating system. Electron flow valves V108a and V108b comprise the first two stages of the amplifier section 64 of the regulator circuit, said amplifier section including an electron flow valve V109a adapted to serve as a D.C. restorer or clamp tube for maintaining the true shape of a non-symmetrical wave form. The flow valve V109b acts as a cathode follower output tube, a resistor R140 being coupled between the cathodes of the valves V108a and V109b to serve as a feedback path to stabilize amplifier gain. The output of the cathode follower tube V109b may be coupled through a condenser C122 with rectifier tubes V110a and V110b, which serve respectively to maintain the true wave form shape of the signal impulse and to rectify the alternating current signal into a direct current voltage wave. The direct current voltage wave thus obtained may be amplified in a non-inverting stage comprising the flow valve means V111a and V111b, which is directly coupled with current amplifying means comprising the valves V112a and V112b. Current variations thus produced in the current amplifier produce corresponding voltage variations across resistors R101 and R102, such voltage variations causing the sensitivity of the detector coupled between the terminals 59 to be regulated in such manner as to obtain a constant average output energy level from the detector, even though the output energy of the X-ray generator and the background density of the examination objects may vary considerably.

When applied to the detection of voids in explosive rocket heads comprising an outer shell W of steel, a fill of explosive F, and a conical insert M as of copper, the examination object may be moved axially in the scanning beam as it is turned about its longitudinal axis. As can be seen from the configuration of the examination object, as shown in Fig. 3, its X-ray absorption background varies over a substantial range, the scanned section progressively increasing in thickness throughout the first two scanning zones, to become a maximum in zone 3, and thereafter diminishing progressively to a minimum through the remaining scanning zones. The regulator circuit, however, has sufficient range to hold the sensitivity of the void detecting amplifier essentially constant over the entire section of the examination object. Accordingly, any abrupt variation in the impedance of the detector will indicate an imperfection in the article being inspected; and by moving the article and scanning the same during the inspectional process in the manner heretofore described, the exact size, location, and general nature of the imperfection may be determined.

Any suitable or preferred indicating, recording, marking, or reject equipment may be actuated under the control of the load device or relay RE101. For example, suitable paint spraying equipment, or other object marking or rejecting apparatus, may be mounted, as on the framework 15 at each of the examination stations, in position to apply paint as a reject marking whenever the corresponding load device or relay RE101 is actuated in response to a defect in the examination object being scanned at the station. Each void may thus be marked with a dot or streak of paint in registration with the defect. Alternately, graphical charts may be made and preserved in order to provide a precise visual record of the inspected condition of examined objects.

It will be seen that, as examination objects are moved out of the ray beams B, as the result of indexing movement of the frame 16, the resultant sudden increase in the intensity of the ray beams, as applied upon the detectors, is likely to result in spurious void indicating operation of the apparatus. Conversely, where employed to detect abnormally dense zones or occlusions in examination objects, the apparatus may operate falsely as the result of sudden decrease in beam intensity, as applied on the detectors, when examination objects enter the scanning beams as the result of indexing movement of the frame 16. In order to prevent such spurious operation, control switch means may be provided for disabling the translation system during indexing movement of the frame 16. To this end, separate switch means may be provided for each of the several translation systems, or a single switch may be provided for commonly controlling all of said systems. The disabling switch means may be and preferably is connected to control the operation of the devices OD, although it will be obvious that the disabling switch means could, if desired, be connected in any suitable or preferred location in the translation system 58.

Figures 4, 5, 6:
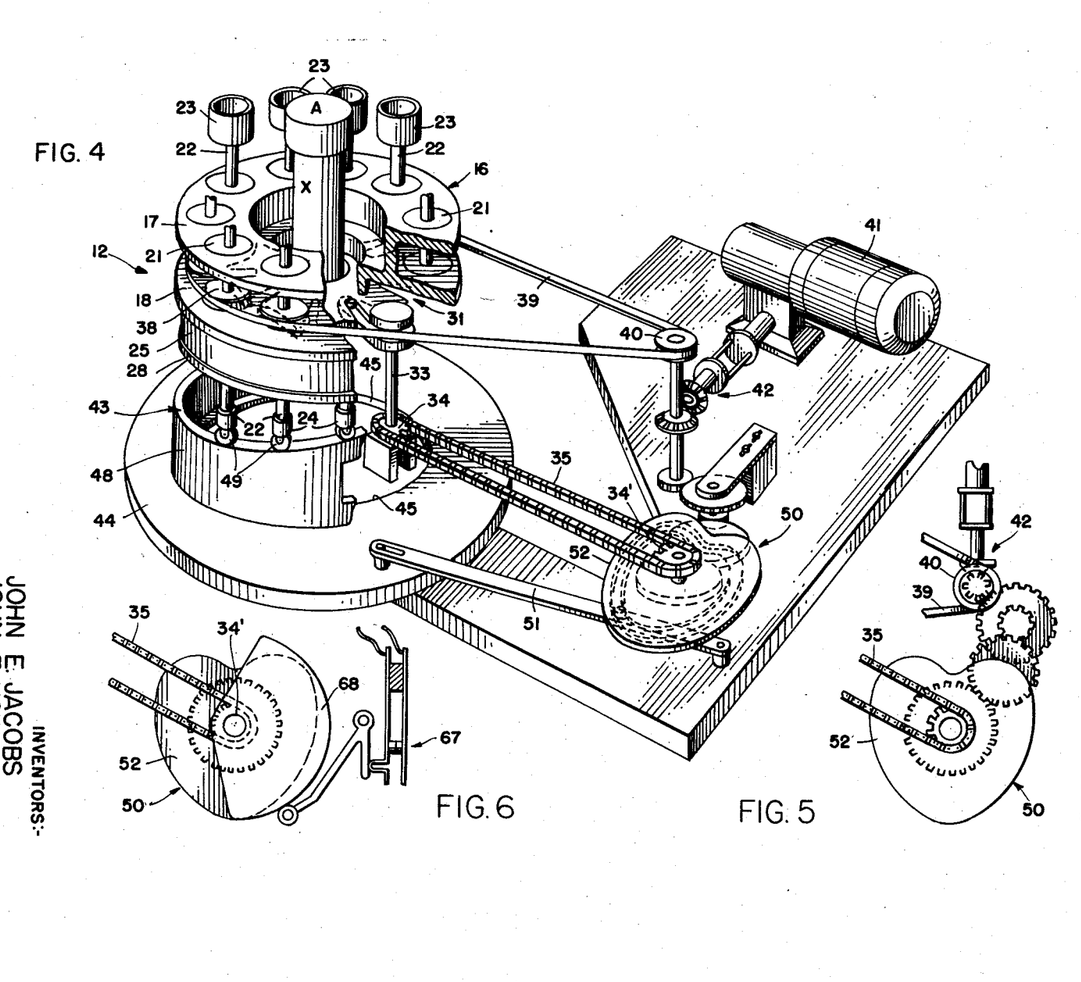
Fig. 4 is a diagrammatic view of the apparatus shown in Figs. 1 and 2.
Fig. 5 is a plan view of transmission means forming a portion of the apparatus shown in Fig. 4.
Fig. 6 is a diagrammatic view showing a disabling switch and a switch actuating cam which may be driven with the transmission means shown in Fig. 5.

As shown in Fig. 6 of the drawings, the control switch means may comprise a switch 67 and a switch actuating cam 68 driven in timed relationship with the indexing mechanism. To this end, the cam 68 may be drivingly connected with the sprocket 34', which drives the Geneva indexing wheel. The switch 67, as shown, may be normally open to control operation of the load devices L-1, L-2, L-3, L-4, L-5, L-6 and L-7 or of the operable devices OD, the cam 68 serving to hold the switch 67 closed except when the frame 16 is being indexed. Alternately, the switch may be normally closed, the cam 68 being arranged to hold the switch open at intervals, to thereby disable the system in desired fashion during indexing movement of the frame 16.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein disclosed being a preferred embodiment for the purpose of illustrating the invention.

The invention is hereby claimed as follows:

1. Inspection apparatus comprising the combination, with a ray sensitive detector disposed at a scanning station and ray source means for applying a beam of penetrating rays upon said detector, of means for relatively shifting the ray beam and an examination object to be inspected, whereby to scan the object with the beam, along a scan path, to determine the density of the object, along the scan path in terms of the response of the detector to the scanning beam, a translation system for measuring the response of said detector and for controlling the operation of a load device in accordance with said measured response, and regulating means controllingly associated with said system and operable to render the system sensitive to abrupt changes of density as measured by the detector and relatively inert to measured density changes of slow or uniform character.

2. Inspection apparatus comprising the combination, with a ray sensitive detector disposed at a scanning station and ray source means for applying a beam of penetrating rays upon said detector, of means for relatively shifting the ray beam and an examination object to be inspected, whereby to scan the object with the beam, along a scan path, to determine the density of the object, along the scan path in terms of the response of the detector to the scanning beam, a translation system for measuring the response of said detector and for controlling the operation of a load device in accordance with said measured response, regulating means connected with said detector and operable, in accordance with the response thereof to the density measuring rays of said beam, to produce a corresponding voltage wave, and means to apply said wave as a response measuring field on said detector to compensate for variations in the emission intensity of the ray source and in the background density of the examination object.

3. Inspection apparatus comprising the combination, with a ray sensitive detector disposed at a scanning station and ray source means for applying a beam of penetrating rays upon said detector, of means for relatively shifting the ray beam and an examination object to be inspected, whereby to scan the object with the beam, along a scan path, to determine the density of the object, along the scan path in terms of the response of the detector to the scanning beam, a translation system for measuring the response of said detector and for controlling the operation of a load device in accordance with said measured response, regulating means including an amplifier connected with said detector and operable, in accordance with the response thereof to the density measuring rays of said beam, to produce a corresponding voltage wave, and means to rectify said wave and to apply the rectified voltage across said detector to compensate for variations in the emission intensity of the ray source and in the background density of the examination object.

4. Inspection apparatus comprising the combination, with a ray sensitive detector disposed at a scanning station and ray source means for applying a beam of penetrating rays upon said detector, of means for relatively shifting the ray beam and an examination object to be inspected, whereby to scan the object with the beam, along a scan path, to determine the density of the object, along the scan path, in terms of the response of the detector to the scanning beam, a translation system for measuring the response of said detector and for controlling the operation of a load device in accordance with said measured response, regulating means including an amplifier connected with said detector and operable, in accordance with the response thereof to the density measuring rays of said beam, to produce a corresponding voltage wave, means to rectify said wave, and means to amplify said rectified wave and to apply amplified and rectified voltage across said detector to compensate for variations in the emission intensity of the ray source and in the background density of the examination object.

5. Inspection apparatus comprising the combination, with a ray sensitive detector disposed at a scanning station and ray source means for applying a beam of penetrating rays upon said detector, of means for relatively shifting the ray beam and an examination object to be inspected, whereby to scan the object with the beam, along a scan path, to determine the density of the object, along the scan path, in terms of the response of the detector to the scanning beam, a translation system for measuring the response of said detector and for controlling the operation of a load device in accordance with said measured response, regulating means including an amplifier, connected with said detector and operable, in accordance with the response thereof to the density measuring rays of said beam, to produce a corresponding voltage wave, an associated clamp valve to maintain the shape of the wave as transmitted in said amplifier, a cathode follower valve driven by said amplifier, to deliver a voltage wave corresponding to the ray induced response of the detector, means to demodulate or rectify the wave delivered by the cathode follower valve, and means to apply the rectified voltage wave across said detector to compensate for variations in the emission intensity of the ray source and in the background density of the examination object.

6. Inspection apparatus comprising the combination, with a ray sensitive detector disposed at a scanning station and ray source means for applying a beam of penetrating rays upon said detector, of means for relatively shifting the ray beam and an examination object to be inspected, whereby to scan the object with the beam, along a scan path, to determine the density of the object, along the scan path, in terms of the response of the detector to the scanning beam, a translation system for measuring the response of said detector and for controlling the operation of a load device in accordance with said measured response, regulating means including an amplifier, connected with said detector and operable, in accordance with the response thereof to the density measuring rays of said beam, to produce a corresponding voltage wave, an associated clamp valve to maintain the shape of the wave as transmitted in said amplifier, a cathode follower valve driven by said amplifier, to deliver a voltage wave corresponding to the ray induced response of the detector, a feedback connection between the output side of the cathode follower and the input side of the amplifier, means to demodulate or rectify the wave delivered by the cathode follower valve, and means to apply the rectified voltage wave across said detector to compensate for variations in the emission intensity of the ray source and in the background density of the examination object.

7. Inspection apparatus comprising the combination, with a ray sensitive detector disposed at a scanning station and ray source means for applying a beam of penetrating rays upon said detector, of means for relatively shifting the ray beam and an examination object to be inspected, whereby to scan the object with the beam, along a scan path, to determine the density of the object, along the scan path, in terms of the response of the detector to the scanning beam, a translation system for measuring the response of said detector and for controlling the operation of a load device in accordance with said measured response, said system embodying an amplifying section having an input side connected with said detector, a relay section having an output side connected with the load device to be actuated, and a pulse height selector section coupling the output side of the amplifying section with the input side of the relay section.

8. Inspection apparatus comprising the combination, with a ray sensitive detector disposed at a scanning station and ray source means for applying a beam of penetrating rays upon said detector, of means for relatively shifting the ray beam and an examination object to be inspected, whereby to scan the object with the beam, along a scan path, to determine the density of the object, along the scan path, in terms of response of the detector to the scanning beam, a translation system for measuring the response of said detector and for controlling the operation of a load device in accordance with said measured response, said system embodying an amplifying section comprising electron flow valevs forming a non-inverting amplifier operable as a cathode follower input circuit, and means for drivingly connecting the amplifying section for the operation of said load device.

9. Inspection apparatus comprising the combination, with a ray sensitive detector disposed at a scanning station and ray source means for applying a beam of penetrating rays upon said detector, of means for relatively shifting the ray beam and an examination object to be inspected, whereby to scan the object with the beam, along a scan path, to determine the density of the object, along the scan path, in terms of the response of the detector to the scanning beam, a translation system for measuring the response of said detector and for controlling the operation of a load device in accordance with said measured response, said system embodying an amplifying section comprising electron flow valves forming a negative feedback loop to maintain relatively constant amplification despite internal parameter changes, and means for drivingly connecting the amplifying section for the operation of said load device.

10. Inspection apparatus comprising the combination, with a ray sensitive detector disposed at a scanning station and ray source means for applying a beam of penetrating rays upon said detector, of means for relatively shifting the ray beam and an examination object to be inspected, whereby to scan the object with the beam, along a scan path, to determine the density of the object, along the scan path, in terms of the response of the detector to the scanning beam, a translation system for measuring the response of said detector and for controlling the operation of a load device in accordance with said measured response, said system embodying an amplifying section comprising electron flow valves and associated energy feedback means interconnected to cause substantially higher feedback in response to negative going signals than is caused in response to positive going signals, thereby requiring substantially greater amplitude in negative going signals than in positive going signals for saturation of the amplifier, and means for drivingly connecting the amplifying section for the operation of said load device.

11. Inspection apparatus comprising the combination, with a plurality of circularly spaced ray sensitive detectors disposed at corresponding scanning stations and ray source means for applying a beam of penetrating rays upon each of said detectors, of carrying means for successively disposing an examination object in said ray beams at said stations and for relatively shifting the ray beam and the examination object to be inspected, in the direction of an axis of the object while turning the object about said axis, whereby to scan the object with the beam, along a helical path, to thereby determine the density of the object, along said helical scan path, in terms of the response of the detector to the scanning beam, and a translation system connected with each detector for measuring each the response of its associated detector and for operating a load device in accordance with said measured response.

12. Inspection apparatus comprising the combination, with a plurality of circularly spaced ray sensitive detectors disposed at corresponding scanning stations and ray source means for applying a beam of penetrating rays upon each of said detectors, of carrying means for successively disposing an examination object in said ray beams at said stations and for relatively shifting the ray beam and the examination object to be inspected, in the direction of an axis of the object while turning the object about said axis, whereby to scan the object with the beam, along a helical path, to thereby determine the density of the object, along said helical scan path, in terms of the response of the detector to the scanning beam, a translation system connected with each detector for measuring each the response of its associated detector and for operating a load device in accordance with said measured response, and regulating means controllingly associated with said system and operable to render the same sensitive to abrupt density changes as measured by the detector and relatively inert to measured density changes of uniform character.

13. Inspection apparatus comprising the combination, with a plurality of spaced apart ray sensitive detectors disposed at corresponding scanning stations and ray source means for applying a beam of penetrating rays upon each of said detectors, of carrying means for successively disposing an examination object in said ray beams at said stations and for relatively shifting the examination object and said ray beams, whereby to scan the object with the beams, along scan paths, to determine the density of the object along said paths in terms of the responses of said detectors to the scanning beams, a translation system connected with each detector for measuring each the response of its associated detector to incident rays and for controlling the operation of a corresponding load device in accordance with said measured response, and regulating means controllingly associated with each of said systems and operable to render the system sensitive to abrupt density changes as measured by the detector and relatively inert to measured density changes of uniform character.

14. Inspection apparatus comprising the combination, with a plurality of spaced apart ray sensitive detectors disposed at corresponding scanning stations and ray source means for applying a beam of penetrating rays upon each of said detectors, of carrying means for successively disposing an examination object in said ray beams at said stations and for relatively shifting the examination object and said ray beams, whereby to scan the object with the beams, along scan paths, to determine the density of the object along said paths in terms of the responses of said detectors to the scanning beams, and a translation system connected with each detector for measuring each the response of its associated detector to incident rays and for controlling the operation of a corresponding load device in accordance with said measured response, said system including an amplifying section having an input side connected with the associated detector, a relay section having an output side connected with the load device to be actuated, and a pulse height selector section coupling the output side of the amplifying section with the input side of the relay section.

15. Inspection apparatus comprising the combination, with a plurality of spaced apart ray sensitive detectors disposed at corresponding scanning stations and ray source means for applying a beam of penetrating rays upon each of said detectors, of carrying means for successively disposing an examination object in said ray beams at said stations and for relatively shifting the examination object and said ray beams, whereby to scan the object with the beams, along scan paths, to determine the density of the object along said paths in terms of the responses of said detectors to the scanning beams, a translation system connected with each detector for measuring each the response of its associated detector to incident rays and for controlling the operation of a corresponding load device in accordance with said measured response, said system having an amplifying section comprising electron flow valves forming a negative feedback loop to maintain relatively constant amplification despite internal parameter changes, and relay means for drivingly connecting the amplifying section for the operation of said load devices.

16. Inspection apparatus comprising the combination, with a plurality of circularly spaced ray sensitive detectors disposed at corresponding scanning stations and ray source means for applying a beam of penetrating rays upon each of said detectors, of carrying means for successively disposing an examination object in said ray beams at said stations and for relatively shifting the object and said ray beams, whereby to scan the object with the beams, along scan paths, to determine the density of the object along said paths in terms of the responses of said detectors to the scanning beams, a translation system connected with each detector for measuring each the response of its associated detector to incident rays, said systems being connected for operating corresponding load devices, disabling switch means operatively associated with said systems to prevent operation of said load devices while an examination object is being moved from one scanning station to another.

17. Inspection apparatus as set forth in claim 16, and including regulating means controllingly associated with each of said translation systems and operable to render the same sensitive to abrupt density changes as measured by the detector and relatively inert to measured density changes of slow or uniform character.

18. Inspection apparatus as set forth in claim 16, wherein each translation system includes an amplifying section having an input side connected with its associated detector, a relay section having an output side connected with the load device to be actuated, and a pulse height selector section coupling the output side of the amplifying section with the input side of the relay section.

19. Inspection apparatus as set forth in claim 16, wherein the translation system embodies an amplifying section comprising electron flow valves forming a negative feed back loop operable to maintain relatively uniform amplification despite internal parameter changes, and relay means for connecting the amplifying section for the operation of its associated load device.

20. Inspection apparatus comprising the combination, with a plurality of circularly spaced ray sensitive detectors disposed at corresponding stations and ray source means for applying a beam of penetrating rays upon each of said detectors, of carrying means for successively disposing an examination object in said ray beams at said stations and for relatively shifting the object and said ray beams, whereby to scan the object with the beams, along scan paths, to determine the density of the object along said paths in terms of the responses of said detectors to the scanning beams, said carrying means comprising a frame encircling said source and providing for the support of examination objects in circularly spaced relation thereon, indexing means operable to turn said frame progressively to present an examination object successively at said scanning stations, a translation system connected with each detector for measuring each the response of its associated detector to incident rays, said systems being connected for operating corresponding load devices, disabling switch means operatively associated with said systems, and means to actuate the disabling switch means during operation of said indexing means.

References Cited in the file of this patent

UNITED STATES PATENTS

| | | |
|---|---|---|
| 2,370,163 | Hare | Feb. 27, 1945 |
| 2,557,868 | Fua et al. | June 19, 1951 |
| 2,598,825 | Orellana | June 3, 1952 |
| 2,653,247 | Lundahl | Sept. 22, 1953 |
| 2,669,662 | Lundahl et al. | Feb. 16, 1954 |
| 2,682,801 | Davidson et al. | July 6, 1954 |
| 2,713,125 | Geisler | July 12, 1955 |
| 2,750,986 | Russell et al. | June 19, 1956 |